Aug. 16, 1960  S. V. SWANSON  2,949,017
TIME TEMPERATURE DEFROST CONTROL
Filed June 7, 1957  2 Sheets-Sheet 1

INVENTOR
SVEN V. SWANSON

BY
ATTORNEYS

Aug. 16, 1960     S. V. SWANSON     2,949,017
TIME TEMPERATURE DEFROST CONTROL
Filed June 7, 1957                                   2 Sheets-Sheet 2

INVENTOR
SVEN V. SWANSON
BY
ATTORNEYS

United States Patent Office 2,949,017
Patented Aug. 16, 1960

2,949,017

TIME TEMPERATURE DEFROST CONTROL

Sven V. Swanson, Niles, Mich., assignor to Tyler Refrigeration Corporation, Niles, Mich., a corporation of Michigan Filed June 7, 1957, Ser. No. 664,238

7 Claims. (Cl. 62—155)

This invention refers generally to defrost controls for refrigeration units, and more particularly, to time temperature defrost controls for use with commercial refrigeration installations.

A search for the ideal defrost control has been projected into three different series of control which are applied particularly to electric defrost, that is, where a heating unit is energized to assist in the defrosting process.

The simplest control is the straight timer which is simply a clock timer adapted to mechanically shut off the compressor unit and activate the heater unit for a predetermined length of time which corresponds, as conditions may dictate, to an operating length of time—such as a day, or a 2-day period.

The straight timer control has the disadvantage that the predetermined set time for defrost must be predicated on the most severe conditions of defrost. In store display cases, for instance, it may be that five days a week the defrost period need be no more than 40 or 45 minutes, while the sixth day would require a defrost period of 60 minutes or more. In order to accommodate the most severe conditions, the pre-set timer must necessarily be set for the 60 minute or more defrost cycle, thereby unduly warming the cases during the other days of the week when such a long period of defrost is not necessary. Since the straight timer devices are controlled solely by the timer, the termination of the defrost mechanism and reactivation of the compressor is dependent upon the proper operation of the timer. Should the clock fail while the unit is on "defrost," an obviously undesirable condition would result, in that the refrigeration to that particular unit would remain off until noticed and manually reactivated.

A second known control, namely a time pressure defrost control, avoids some of the limitations of the straight timer control by adding a pressure bellows to the control system, so that a predetermined rise of pressure within the refrigerating system can terminate the defrost cycle if such pressure should be satisfied before the termination of the pre-set time. The pressure bellows are connected to the low side of the refrigerating system, that being the side which corresponds directly to the temperature, so that when the pressure in the low side of the refrigerating system reaches a predetermined point, it will be indicative of the temperature of the coldest point, generally the coil of the system, so as to quite satisfactorily indicate at a given pressure that the coil is clear of frost.

In modern foodstore applications, it is often necessary to run refrigerant lines over an extremely long distance, and it has been necessary to group the various refrigerant lines in a trench, or conduit, beneath the floor of the store. As a result of this grouping of refrigerant lines, the various lines may well be cooled by one another. Since the pressure in a refrigerating system responds to the temperature of the coldest point, pressure of the system is actually controlled by the trench temperature rather than the coil temperature. This, of course, eliminates the effectiveness of the time pressure defrost control. In installations such as above, with the lack of effective control responsive to pressure, the time pressure control system reverts, in effect, to a straight time control, and is consequently subject to the limitations first set forth above.

The third, and generally most satisfactory class of defrost control, is the time temperature control. This control system is, like the others, initiated by a timer and may be deenergized either by a predetermined coil temperature, or elapse of a predetermined period of time, depending upon which occurs first. Since it is a more direct method of measuring coil temperature and hence effective defrost, it is more accurate than the two previously mentioned controls. The time temperature control as it is known in the art today utilizes a timer which is adapted to mechanically operate a transfer control for initiating a defrost circuit and rendering the operative circuit ineffective. A thermostat located at the coil is adapted to energize a solenoid upon the temperature of the coil reaching a predetermined temperature. When the solenoid is energized, it operates the transfer contact to shut off the defrost heater and to reactivate the refrigerator compressor.

The time temperature controls of the prior art require complex wiring and further, the substitution thereof in existing installations of straight and time pressure controls is negated by the differences in the components of the controls. In the time temperature control, the refrigerant coil thermostat must be wired in series with the operating solenoid and requires a pilot circuit to perform this duty. In addition to the pilot circuit, operating and energizing circuits for the heater units and the compressor motor also must be provided. Because of these limitations, prior time temperature control systems have had to be designed for a particular system and were possessed of little or no interchangeability so as to be adaptable for use with refrigerating systems utilizing either of the other above discussed two methods of defrost control.

The adaptability of my improved control system is such that I am able to use the external wiring of existing devices as an integral part of my system.

My invention concerns a new and novel electromechanical control system wherein a normally open thermostat is wired directly in series with the heating circuit, which in turn controls a line relay for the activation or de-activation of a solenoid for operating transfer means which in turn controls the defrost cycle of the mechanism.

It is an object of my invention to provide a defrost control system which may be readily embodied with any one of the three aforementioned types of controls by utilizing an "open on rise" type of thermostat for the refrigerator unit to provide a system which obviates the above and other objections and limitations of prior controls.

It is another object of my invention to eliminate the necessity for the required pilot circuit in defrost control systems of the prior art.

Another object of my invention is to provide a defrost system for a compressor operating a number of individual cooling coils whereby the heat to a particular coil may be discontinued upon the coil thermostat reaching a predetermined temperature while the heat to the remaining coils is continued until all coils have been defrosted, at which time the defrost cycle is terminated.

A further object of my invention is to provide a compact control system for utilization with refrigeration systems having open-on-rise thermostats in their defrosting systems by merely attaching the circuit leads to the provided terminals.

Still another object of my invention is to provide a defrost control system with new and improved means for resetting the activating means at the end of the defrost cycle.

It is a feature of one embodiment of my invention to provide electronic means for resetting the activating means at the end of the defrost cycle.

These and other objects of my invention will be apparent to those skilled in the art from the following detailed description of certain preferred embodiments of my invention.

Figure 1:
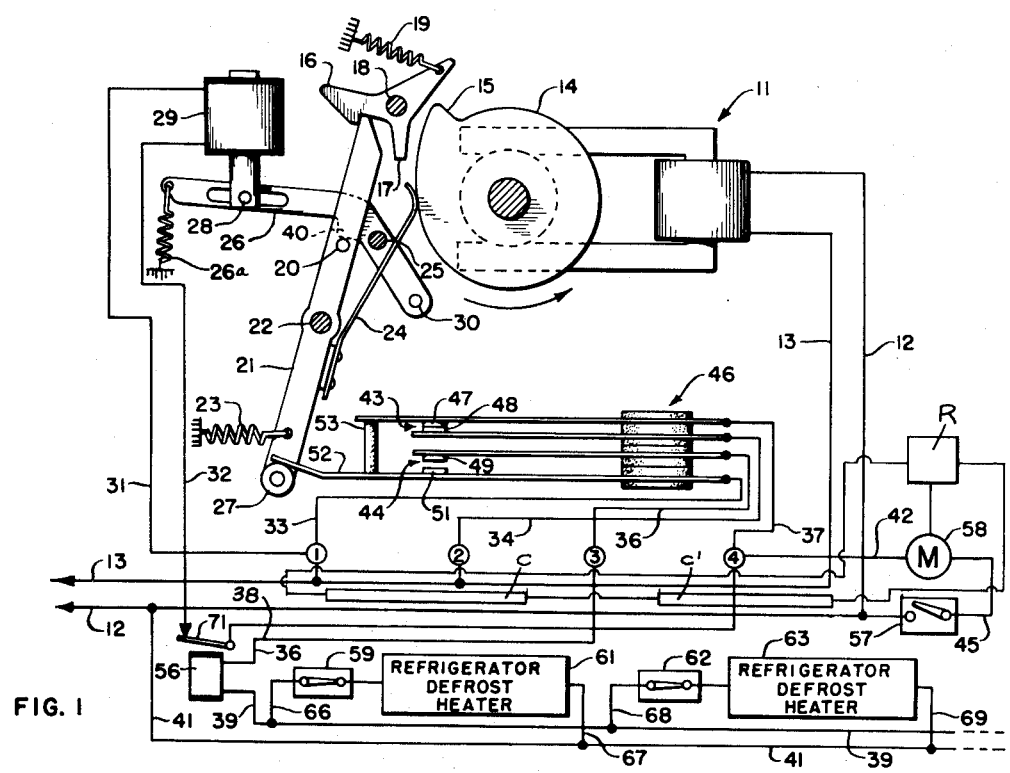
Figure 1 is a schematic representation of the electro-mechanical system of my invention as applied to a single compressor-multiple-coil refrigerating system.

In the invention to be hereinafter described, a relay is understood to be the conventional type relay which is energized by passing a current through its windings to attract an armature which is associated therewith. A make contact is a pivoted conductor which is normally spring biased away from the relay and is attracted to the relay, usually by operation of the armature, to engage a second contact thereby completing a circuit. A break contact is a pivotal conductor which is similarly spring biased away from the relay, but is engaged with a second contact in its biased position so that operation of the relay disengages the two contacts to break the circuit of which they are a part. A transfer, or make and break contact, is a pivoted conductor which is spring biased away from its relay into contact with a second contact to complete a circuit, but is so positioned that when its relay is operated it is attracted thereto into engagement with a third contact whereby energization of the relay breaks one circuit and makes or completes a second circuit. These relay contacts are represented in the drawing by conventional symbols.

Referring now to Figure 1, a conventional timer 11 is connected across the electrical supply lines 12 and 13 so as to be continuously energized. A cam 14 is secured on the armature of the timer motor 11 for rotation in a counter-clockwise direction, as viewed in the drawing, at a predetermined uniform speed. The cam 14 has formed thereon a lobe 15, which is shaped to come in contact with the cam surface 17 of the latch pawl 16 to rotate the latch pawl 16 clockwise about its pivot 18 against the urging of a latch pawl spring 19. The latch pawl spring 19 is secured at one end to latch pawl 16 and its other end is suitably anchored, as diagrammatically shown in the drawing, so that the spring 19 tends to rotate pawl 16 in a counter-clockwise direction. A lever 21 is pivotally mounted in any suitable manner at 22, and is normally urged to rotate in a clockwise direction by a spring 23 which is secured at one end to one end of lever 21 and has its other end fixed, as diagrammatically shown on the drawing. A leaf spring 24 is secured at one end to lever 21 and its free end is formed with a curved portion for contact with the periphery of cam 14 and is arranged so as to oppose clockwise rotation of the lever 21 about its pivot 22. As the cam 14 rotates in its counterclockwise direction, the curved end portion of leaf spring 24 rides up on the cam lobe 15 to load and build up energy in the spring 24. During loading of the spring 24, the lever 21 is held against counter-clockwise rotation by reason of the engagement of its upper end with latch lever 16. When the leaf spring 24 is adequately loaded to overcome the force of the spring 23, the cam lobe 15 contacts the camming surface 17 of the latch lever 16 to rotate it out of its latching position, thereby conditioning the lever 21 for counter-clockwise rotation by the spring 24. A roller 27 is suitably journalled at the lower extremity of the lever 21 and is associated in a camming relationship with a blade extension 52 of a contact blade 51 of a contact bank assembly 46, for moving the contact blade 51 in an upward direction in response to the counter-clockwise rotation of the lever 21.

A solenoid 29, adapted to be electrically energized through conductors 31 and 32 as hereinafter explained, has a movable plunger 28 which is connected at its outer end by way of a pin and slot connection to one arm of a bell crank latch lever 26, which is in turn pivoted intermediate its ends at pivot 25, and is normally urged to rotate in a counterclockwise direction about the pivot 25 by a spring 26a secured at one of its ends to the other end of the slotted arm of lever 26 and is fixed at its other end, as diagrammatically illustrated in Figure 1.

The aforementioned contact bank assembly 46 includes contact blades 47, 48, 49, and the previously mentioned contact blade 51, and is, along with its motivating device, a transfer means which serves as the electro-mechanical link between the above described mechanical apparatus and the components of the defrost system, including the pair of heaters 61 and 63, and the compressor motor 58 of a conventional refrigeration system, indicated generally at R, and including refrigerator coils C and C′ disposed, respectively, in juxtaposition of the heaters 61 and 63. The contact bank assembly affords first and second switch means 43 and 44 with the contacts at the free ends of contact blades 47 and 48 defining first switch means 43, and the contacts at the free ends of contact blades 49 and 51 defining second switch means 44. An insulated stem 53 is secured at one end adjacent the inclined end 52 of blade 51 and the stem 53 at its other or upper end is adapted to actuate contact blade 47. Contact blade 51, when biased upwardly, effects closing of the second switch means 44, followed by the subsequent opening of the first switch means 43 through the operation of stem 53 to effect operation of the system, as will be described hereinafter. The aforementioned sequential closing and opening of the switches 44 and 43 may be achieved by regulating the length of stem 53 and additionally by forming the blade 47 of material of greater spring resistance than that of contact blade 51. The contact blade 51 is electrically connected to terminal 1 and thereby to the supply line 13 by a conductor or lead 33, and through a conductor or lead 31, to a solenoid 29. The contact blade 48 is also electrically connected to the supply line 13 through terminal 2 by conductor or lead 34. The contact blade 49 is electrically connected through terminal 3 by conductor or lead 36 to a relay 56, the purpose of which is hereinafter related. The contact blade 47, as shown, is electrically connected by a conductor or lead 37 to terminal 4, and thereby to one side of the compressor motor 58 and also with a conductor or lead 38 which is electrically connected to the armature or break contact 71 for relay 56. The armature 71 serves as a switch blade and is adapted to open and close the circuit between the lead 38 and the lead or conductor 32 extending to solenoid 29.

The defrost heaters 61 and 63 are connected to the supply line 12 through a lead or conductor 41, and connections 67 and 69, extending from lead 41 to heaters 61 and 63, respectively. The heaters 61 and 63 have electrical connection with thermostatic switches 59 and 62, respectively, which switches in turn are electrically connected by leads or conductors 66 and 68, respectively, to a lead or conductor 39 extending to the relay 56. The heaters 61 and 63 are adapted to have connection with the supply line 13 through relay 56, lead or conductor 36, terminal 3, switch means 44 when closed, terminal 1, and lead or conductor 33. The thermostatic switches 59 and 62 are disposed in a conventional way relative to the coils C and C' of the refrigerating system R to be responsive to the temperatures thereof.

The above described embodiment of my invention depends for its operation upon the single current relay 56, as will now be described. As the timer motor 11 is operated, the timing cam 14 is rotated in a counter-clockwise direction and the leaf spring 24 is gradually loaded by being biased toward the lever 21. As previously noted, the lever 21 is restrained from rotation about its pivot by the latch lever 16. At the time predeterminedly selected for defrost, the lobe 15 of the cam 14 contacts the camming lever 17 on the latch lever 16 and rotates the lever 16 clockwise about its pivot 18 against the force of the latch lever spring 19. Upon rotation of the latch lever 16 in a clockwise direction, the lever 21, motivated by the energy stored in spring 24, is rotated in a counter-clockwise direction about its pivot 22 and against the biasing force of the lever spring 23. Counter-clockwise rotation of the lever 21 causes the insulated roller 27 to move to the right (Figure 1), thereby moving the blade extension 52, by virtue of its configuration, in an upward direction. Upward movement of the blade extension 52 brings the contact blade 51 into engagement with the contact blade 49, thereby closing the switch means 44, and, after a predetermined extent of movement, brings the insulated stem 53 into contact with the contact blade 47 with sufficient pressure to move the contact blade 47 away from the contact blade 48 and thereby open the switch means 43.

It will be observed when the switch means 43 is closed, a refrigerator circuit for operating the compressor of the refrigeration system R is established through the compressor motor 58 from the line 12, normally closed pressure switch 57, conductor 45, compressor motor 58, conductor 42, terminal 4, conductor 37, switch means 43, conductor 34, terminal 2, to the line 13. As long as the transfer switch means 43 is closed and relay 56 de-energized, the solenoid 29 is energized by reason of being in a circuit in a branch in parallel with the refrigerator motor.

When the lever 21 has been rotated counter-clockwise by the spring 24, the bell crank lock lever 26 is rotated counter-clockwise by its spring 26a, and the lever 21 is held in its rotated position by interfering engagement of the pin 20 on the lever 21 with the shoulder 40 on the lock lever 26. Movement of lever 21, as already explained, effects the closing of transfer switch means 44 and subsequent delayed opening of transfer switch means 43.

Now, when the switch means 44 is closed, a heating circuit is completed from the line 12, the conductor 41, the conductor 67, the defrost heater 61, the normally closed thermostatic switch 59, the conductor 66, the conductor 39, the relay 56, the conductor 36 and terminal 3, switch 44, the conductor 33, and terminal 1 to the line 13. When a pair of defrost heaters is used, such for example, as heater 63, a circuit is also completed through it, via conductor 68, normally closed thermostatic switch 62, the heater 63, and conductor 69 to conductor 41 to the line 13.

Upon energization of the coil of relay 56, the member 71, serving both as an armature and switch blade, is attracted and opens the circuit from solenoid 29 to the line 12. After the switch means 44 is closed, the switch means 43 opens, thereby interrupting the operating circuit for the compressor motor 58.

When the temperature of a refrigerator coil reaches a predetermined temperature, the thermostat associated therewith opens, for example; when the coil C with which thermostat 59 is associated reaches the predetermined tempreature, thermostat 59 interrupts the defrost heater operating circuit and de-energizes the defrost heater 61. Similarly, upon thermostat 62 associated with coil C' reaching its predetermined temperature, it effects de-energization of defrost heater 63. Of course, any number of thermostats and defroster heaters may be provided and the refrigeration will not be re-instituted until all of them have de-energized their respective defrost heaters except as noted below. De-energization of the relay 56 releases the armature or break contact 71 to a position completing a circuit for energizing the solenoid 29 which extends from the side 12 of the supply line through the closed pressure switch 57, the conductor 45, the compressor motor 58, the conductor 42, the terminal 4, the conductor 38, the armature or break contact 71, the conductor 32, the solenoid 29, the conductor 31, the terminal 1, and the conductor 33, to the line 13. The solenoid 29, upon being energized fully, draws its plunger 28 upwardly to rotate the locking lever 26 in a clockwise direction, thereby releasing shoulder 40 from pin 20 whereupon the lever 21 is rotated in a clockwise direction by the spring 23 until latched by the latch lever 16. Clockwise rotation of the lever 21 moves the insulated roller 27 to the left, to allow the contact blades of the contact bank 46 to return to their normal position, as shown in Figure 1. The timer latching mechanism is thus reset by the action of the solenoid and the solenoid 29 is again shunted by the closing of the switch means 43. The defrost control is now reset and conditioned for a subsequent operation when the timing cam 14 has made another revolution.

A safety feature of my invention resides in the cam lobe 15 of the cam 14, being cooperable with the pin 30 on the locking lever 26 when the locking lever 26 is in its locking position, so that in case the solenoid does not operate to discontinue the defrost cycle and reset the timing mechanism by the time that the lobe 15 has advanced a predetermined amount of a revolution, it will contact the pin 30 and rotate the locking lever 26 in a clockwise direction to effect the same resetting operation as that effected by the solenoid operation described above.

Figure 4:
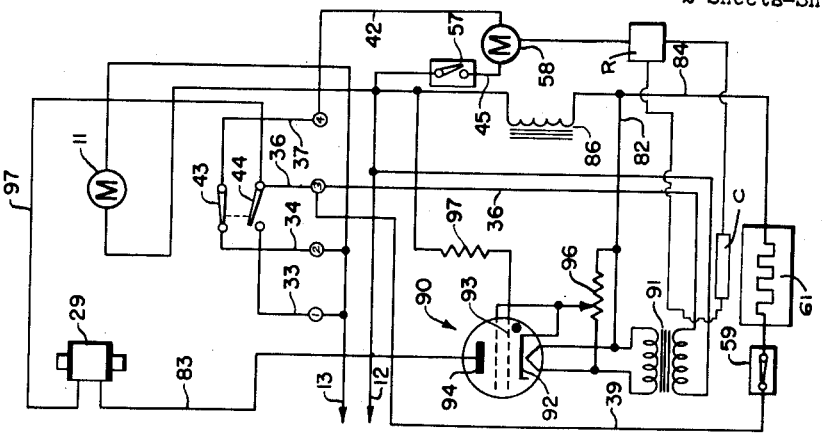
Figure 4 is a circuit diagram of an embodiment of my invention wherein a thyratron tube is utilized to control the solenoid.
Figure 3:
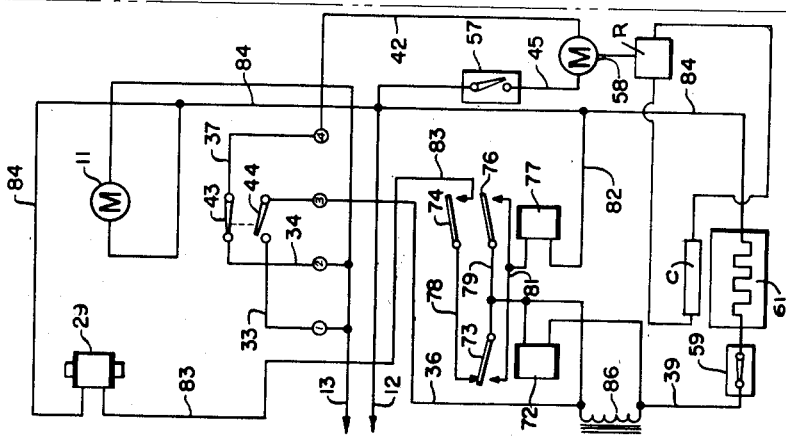
Figure 3 is a circuit diagram of my invention wherein a saturable reactor is connected in parallel with the reset relay.
Figure 2:
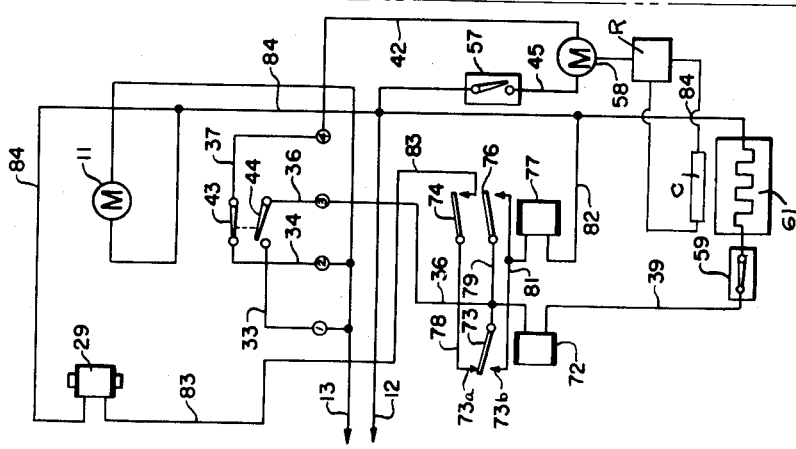
Figure 2 is a circuit diagram of my invention illustrating the use of a second relay in conjunction with the reset relay.

The mechanical aspects of my invention which have been heretofore described and are illustrated in Figure 1 are adapted to initiate and operate the embodiments of my invention, as shown in Figures 2, 3, and 4. Where possible, the same reference numerals are used to indicate the same or similar elements in Figures 2, 3, and 4, as are represented and described in connection with Figure 1. The contact bank assembly of the transfer means to be utilized with the embodiments illustrated in Figures 2, 3, and 4, is the same as that shown in Figure 1 with the exception that the opening and closing of the switches 43 and 44 may be simultaneous, since there is no need for the switch 43 to be closed during the initial operation of switch 44. Thus, in such regard, the stem 53 is not foreshortened but may engage at its opposite ends with spring elements 47 and 51, and both of which elements may be of the same material.

In the embodiment of my invention, illustrated in Figure 2, the aforedescribed shunting of solenoid 29 to prevent its operation is eliminated, and an additional relay is utilized.

In the following description of the embodiments of my invention shown in Figures 2 through 5, the defrost controls are described in association with a single heater unit, but it is to be understood that a plurality of heater units may be used by connecting them in parallel as illustrated and above described in connection with Figure 1.

Referring again to Figure 2, the relay 72 there shown is for purposes of opening the circuit for the solenoid 29 while the heater 61 is operating, and relay 77 is utilized primarily to prevent the operation of the solenoid 29 during the initial flow of current to the heater 61, and as a conditioning means for conditioning the operating circuit of the solenoid 29.

In the condition illustrated in the drawing, the compressor motor 58 of refrigerator means R including coil C is energized, the circuit extending from the line 12, pressure switch 57, conductor 45, compressor motor 58, conductor 42, terminal 4, conductor 37, switch 43, conductor 34, and terminal 2 to line 13. When the timer 11 initiates the defrost cycle as previously described, the switch 43 is opened and the switch 44 is closed an instant later. Opening of the switch 43 de-energizes the aforedescribed operating circuit to the compressor motor 58 of refrigerator system R. Closing of transfer switch 44 completes an operating circuit to the heater 61 from the supply line 12, through the conductor 84, the heater 61, thermostatic switch 59, the conductor 39, the relay 72, the conductor 36, conductor 33, the switch 44, to the line 13 through the terminal 1. Since the heater operating circuit has the relay 72 in series therewith, the completion of that circuit operates the relay 72 to move the transfer contact arm 73 from the terminal 73a to the terminal 73b. The connection of the contact 73 with the terminal 73b completes an operating circuit for the coil of relay 77 extending from the line 12 through the conductor 84, the conductor 82, the relay 77, the conductor 81, the transfer contact arm 73, the conductor 36 and terminal 3, the switch 44, and the conductor 33 to the line 13 through terminal 1. Energization of relay 77 effects closing of its two make contacts 74 and 76. The closing of the make contact 74 conditions the operating circuit for the solenoid 29 for operation, while the make contact 76 completes a holding circuit for the relay 77 through the switch 44.

When a defrost cycle is completed and the refrigerator coil C which is being defrosted reaches a predetermined temperature, the thermostatic switch 59 opens, thereby opening the aforedescribed operating circuit for the heater 61. Interruption of the operating circuit effects de-energization of the relay 72, thereby releasing the transfer contact arm 73 so as to return it to terminal 73a which completes an operating circuit for the solenoid 29 extending from the line 12, through the conductor 84, the solenoid 29, the conductor 83, the make contact 74, conductor 78, transfer contact 73 and 73a, conductor 36, terminal 3, switch 44, the conductor 33 and the terminal 1, to the line 13. Energization of the solenoid 29 simultaneously effects closing of the switch 43 and opening of switch 44 through the above-described transfer mechanism to effect energization of the afore-described compressor operating circuit and de-energization of the aforementioned heater circuit. Relay 77 is accordingly de-energized and the control system is returned to its normal operating condition, as illustrated in Figure 2.

In instances where the current load, due to the operation of heater 61, is relatively high, as where a plurality of heaters is used in the system beyond the capacity of relay 72, I propose, as shown in Figure 3, to include in the system of my invention a saturable reactor 86 connected in the heater circuit parallel with the relay 72. In such modification of my invention the reactor 86 carries the heavy defrost current, and the current through the relay 72 is proportional to the voltage drop across the reactor 86. Laminations and winding of the reactor 86 are so proportioned that above a certain minimum current the core is magnetically saturated and the rise in voltage at higher currents is relatively small, since it is only proportional to the reactance of the winding alone. The operation of the system of Figure 3, except as noted in regard to reactor 86, is the same as already above described in connection with Figure 2 of the drawings.

Referring now to the embodiment of my invention, illustrated in Figure 4, a thyratron tube 90 is substituted in the control circuit for the relays 72 and 77 of the previously discussed control systems. The plate 94 of the tube 90 is connected in the operating circuit for the reset solenoid 29, and a filament transformer 91 for the tube 90 is connected to be energized when the defrost cycle is begun by the closing of switch 44.

When the defrost cycle is started, as previously described, the switch 43 is opened and the switch 44 is simultaneously closed. Opening of the switch 43, as before, interrupts the operating circuit to the compressor motor 58. The closing of the switch 44 completes a heater operating circuit from the supply line 12 via conductor 84, heater 61, thermostatic switch 59, conductor 39, terminal 3, conductor 36, switch 44, to the supply line 13 through terminal 1. When current flows through the reactor 86, a biasing voltage is applied to the grid 93. Because the biasing voltage from the reactor 86 may not be sufficient to keep the tube from firing in cases where the heater current is relatively low, I have provided a potentiometer 96 across the secondary filament of the transformer 91 to supply additional biasing voltage in series with that from the reactor 86.

As described above, the initiation of the defrost cycle conditions the thyratron tube 90 for firing by closing the filament circuit, and at the same time holds it from firing by supplying biasing voltage to the grid. Upon the refrigerator coil C which is being defrosted reaching a predetermined temperature, the thermostat switch 59 opens, thereby interrupting the current flow to the reactor 86, and reducing the biasing voltage on the grid 93 to a value sufficiently low for the tube to fire. The tube 90 fires upon this happening and energizes the reset solenoid 29 from line 13 through conductor 33, switch 44, conductor 97, solenoid 29, conductor 83, tube 90, potentiometer 96, conductor 82, reactor 86 and conductor 84 to line 12. Operation of the reset solenoid 29 resets the timing and defrost mechanisms as hereinbefore described.

While I have shown and described certain preferred embodiments of my present invention, it will be understood by those skilled in the art that various rearrangements and modifications may be made therein without departing from the spirit and scope of my invention, as defined in the appended claims.

I claim:

1. In a refrigerating system having a refrigerator coil, means for cooling said coil, and an electrically operated heater for defrosting the refrigerator coil, a defrost cycle control means comprising, a normally open circuit for energizing said heater, thermostatic switch means connected in series circuit with said heater for interrupting the same in response to a predetermined temperature of said refrigerating coil, a normally closed circuit for energizing said cooling means, timing means, first contact means controlled by said timing means for opening said cooling circuit, second contact means controlled by said timing means for closing said heater circuit, solenoid means conditioned by the closing of said heater circuit for subsequent activation to render said second contact means ineffective, and means controlled by the opening of said thermostatic switch means for activating said solenoid means.

2. In a defrost system for a refrigerating system having a refrigerating coil, coil cooling means, a normally closed cooling circuit for operating said cooling means, a normally open defrost circuit, said defrost circuit including a relay means, a heater in said defrost circuit and adjacently associated with said refrigerating coil, a thermostatic switch in series with said heater and operable by the temperature of said coil, a timer, transfer means operated by said timer for opening said cooling circuit and closing said defrost circuit, latching means for holding said transfer means operated, and a solenoid operable by the sequential energization and de-energization of said relay means for rendering said latching means ineffective, whereby the defrost cycle of said refrigerating system is activated by said timer and is terminated by the opening of said defrosting circuit in response to the coil reaching a predetermined temperature.

3. In a time-temperature control system for de-activating a heating unit in response to a predetermined maximum temperature in the coils of a refrigerating unit; a normally closed refrigerator operating circuit; a normally open heater circuit, said heater circuit including heating means wired in parallel in same, switch means in series with said heater means controlled by the temperature of said coils for opening said heater circuit when said coil means reaches a predetermined temperature; transfer means for closing said heater circuit and opening said operating circuit; a timer for actuating said transfer means at predetermined intervals of time; latching means for holding said transfer means operated; solenoid means operable for rendering said latching means ineffective; and a control circuit including means conditioned by the activation of said transfer means for rendering said solenoid operable as last aforesaid in response to the opening of said heater circuit.

4. A time-temperature control system for de-activating a heating unit in response to a predetermined maximum temperature in the coils of a refrigerator comprising: a normally closed cooling means operating circuit; a normally open heating circuit having included therein heater means wired in parallel to one another, thermostatic switch means in series with said heater means controlled by the temperature of said coils to open in response to a predetermined temperature in said coils, and a relay in series with said circuit; a timing means; transfer means activated by said timing means at periodic intervals for opening said operating circuit and closing said heating circuit; latching means for holding said transfer means operated; solenoid means for rendering said latching means ineffective; and a control circuit conditioned by the activation of said transfer means for operating said solenoid means in response to the de-energization of said heater circuit, said control circuit having wired in series therein a normally closed contact held open by the operation of said relay and said solenoid means being operated by the closing of said contact.

5. In a refrigerating system having a refrigerating coil means, cooling means operated by a normally closed circuit and a coil heating means electrically operated by a normally open circuit, an automatic defrost system comprising, timing means, transfer means actuated by said timing means for simultaneously opening said cooling circuit and closing said heater circuit, latch means between said timing means and said transfer means for holding said transfer means operated, a thermostatic switch connected in series with the heater in said heater circuit, a parallel circuit including a saturable reactor and a first relay connected in series in said heater circuit, a second relay means connected in said heater circuit by activation of said first relay means parallel to said heater, reset means including solenoid means conditioned by the actuation of said second relay for operation to render said latch means ineffective upon release of said first relay for actuating said conditioned reset means, whereby the reset means is conditioned by actuation of the heater circuit and the heater circuit is opened by the thermostatic switch in response to a predetermined temperature in the coils to cause said reset means to be operated.

6. In a refrigerating system having a refrigerator coil, a normally closed operating circuit including a compressor and a normally open defrost circuit including a coil heater, an automatic defrost system comprising timing means, transfer means actuated by said timing means at periodic intervals for simultaneously opening said operating circuit and closing said defrost circuit, latching means for holding said transfer means operated, a solenoid for rendering said latching means ineffective, a tube for actuating said solenoid, a circuit connected parallel to said heater in said defrost circuit for energizing the filaments of said tube, means for producing a bias potential connected in series with said heater, means for applying said bias potential to the grid of said tube, and a thermostatic switch in series in said defrost circuit for interrupting said circuit in response to a predetermined temperature in said coil whereby said tube is conditioned for operation by the closing of said defrost circuit and fired by the opening of said circuit to actuate said latching means.

7. In a refrigerator system: cooling coils; a cooling circuit, said circuit having a normally closed switch and an operating means for cooling said coils connected in series therein; a circuit in shunt relationship to said operating means, said shunt circuit having a solenoid and a normally closed contact therein; a heating circuit for defrosting said coils, said heating circuit having in series therein a heating means, a thermostatic switch controlled by the coil temperature for interrupting said heating circuit, and a relay means for opening the normally closed contact in said shunt circuit upon energization; means for opening said cooling circuit; means for closing said heating circuit a predetermined time after opening said cooling circuit; whereby said shunt circuit is conditioned for operation by the opening of said cooling circuit and is actuated by the opening of said heating circuit in response to a predetermined temperature in said coils; and means actuated by the energization of said solenoid by said shunt circuit for restoring said heating and cooling circuits to their normal condition.

References Cited in the file of this patent

UNITED STATES PATENTS

| | | |
|---|---|---|
| 1,913,433 | Doble | June 13, 1933 |
| 2,687,620 | Raney | Aug. 31, 1954 |
| 2,690,526 | Morrison | Sept. 28, 1954 |
| 2,736,173 | Duncan | Feb. 28, 1956 |